Figures 1, 2:
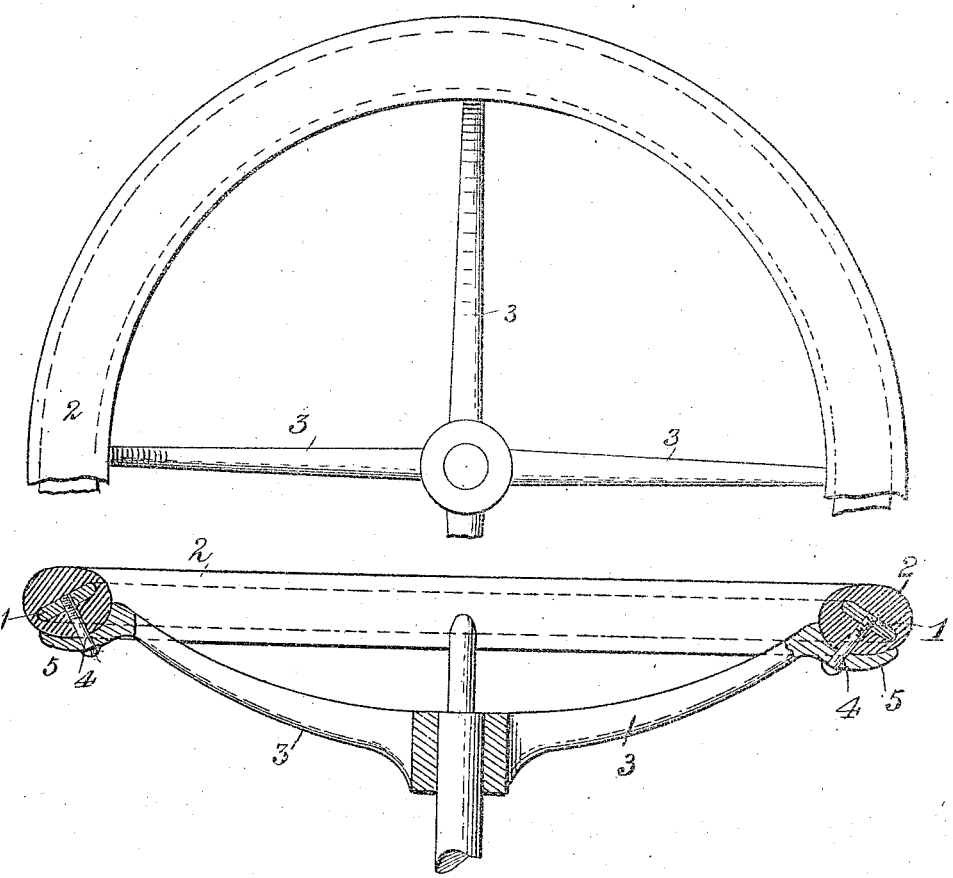

E. K. HARDY.
STEERING WHEEL FOR AUTOMOBILES.
APPLICATION FILED NOV. 8, 1906.

960,907.

Patented June 7, 1910.

Witnesses
F. L. Ourand
Kenneth P. Clarke

Inventor
Edward K. Hardy
By Parsons & Burch, and
James W. Bevans
his Attorneys

UNITED STATES PATENT OFFICE.

EDWARD K. HARDY, OF AKRON, OHIO.

STEERING-WHEEL FOR AUTOMOBILES.

960,907.          Specification of Letters Patent.     Patented June 7, 1910.

Application filed November 8, 1906. Serial No. 342,541.

*To all whom it may concern:*

Be it known that I, EDWARD K. HARDY, a citizen of the United States, residing at Akron, in the county of Summit and State of Ohio, have invented certain new and useful Improvements in Steering-Wheels for Automobiles, of which the following is a specification.

This invention relates to improvements in steering wheels for automobiles, and the object is to provide a wheel having a rim so constructed that a gripping portion is provided with a non-slippable surface, and at the same time to produce a strong and rigid structure.

With the above object in view, the invention consists in the novel features of construction hereinafter fully described, particularly pointed out in the claim, and clearly illustrated by the accompanying drawing, in which—

Figure 1 is a top plan view of a portion of a steering-wheel constructed in accordance with my invention; and Fig. 2, a vertical sectional view therethrough.

In carrying out my invention, I construct the rim of the wheel of a metal cone-shaped ring 1 embedded in a covering 2 of rubber compound.

3 designates the arms of the spider of the wheel, which are secured to the rim portion by screw-bolts or other securing devices which pass through lugs or seats 5 on the ends of said arms in which the rim fits and through the rubber covering into the metallic ring. The ring, being cone-shaped, a securing-device for the bolts is provided, extending substantially parallel to the lugs or seats 5.

From the above description, it will be seen that I have provided a very strong and rigid wheel having a rim of rubber, which forms a non-slippable gripping-surface and that said rim is reinforced by a metallic core.

Having thus fully described my invention, what I claim as new and desire to secure by Letters Patent of the United States, is:

A steering wheel for automobiles having a rigid spider portion, a rim of rubber, a conical-shaped metal ring embedded in said rubber rim, and securing means passing through the arms of the spider and entering said rim.

In testimony whereof I affix my signature in presence of two witnesses.

EDWARD K. HARDY.

Witnesses:
    E. R. GLADWIN,
    E. W. STUART.